United States Patent
Byun

(10) Patent No.: US 9,870,235 B2
(45) Date of Patent: Jan. 16, 2018

(54) RECORDING EVENTS GENERATED FOR PERFORMING A TASK THROUGH USER EQUIPMENT

(75) Inventors: Sung-Ho Byun, Gyeonggi-do (KR); Jae-Won Byun, legal representative, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 13/571,444

(22) Filed: Aug. 10, 2012

(65) Prior Publication Data

US 2013/0080891 A1 Mar. 28, 2013

(30) Foreign Application Priority Data

Aug. 10, 2011 (KR) .................... 10-2011-0079686

(51) Int. Cl.
G06F 9/44 (2006.01)
G06F 3/048 (2013.01)

(52) U.S. Cl.
CPC ............ G06F 9/4443 (2013.01); G06F 3/048 (2013.01)

(58) Field of Classification Search
USPC ................ 715/704, 762, 726; 712/233, 242; 719/320; 700/181
See application file for complete search history.

(56) References Cited

U.S. PATENT DOCUMENTS

| | | | | |
|---|---|---|---|---|
| 5,923,612 A * | 7/1999 | Park | ................ | G06F 9/3017 365/189.07 |
| 6,208,341 B1 * | 3/2001 | van Ee et al. | ................ | 715/716 |
| 7,627,821 B2 * | 12/2009 | Klementiev | ........ | G06F 9/45512 715/704 |
| 7,665,019 B2 * | 2/2010 | Jaeger | .......................... | 715/704 |
| 7,907,966 B1 * | 3/2011 | Mammen | ............ | G06F 9/44542 455/557 |
| 8,024,411 B2 * | 9/2011 | Pulfer et al. | ................... | 709/206 |
| 8,032,765 B2 * | 10/2011 | Dettinger et al. | ............ | 713/193 |
| 8,176,563 B2 * | 5/2012 | Redlich et al. | ................. | 726/27 |
| 8,429,424 B2 * | 4/2013 | Witt et al. | ..................... | 713/193 |
| 2004/0041827 A1 * | 3/2004 | Bischof | ............... | G06F 9/45512 715/704 |

(Continued)

FOREIGN PATENT DOCUMENTS

KR 10-2007-0036445 A 4/2007
KR 10-2008-0052341 A 6/2008

(Continued)

OTHER PUBLICATIONS

U.S. Appl. No. 61/389,874, Momchilov, Greorgy, "Multi-touch Suport for Remote Applications", Oct. 5, 2010.*

*Primary Examiner* — Doon Chow
*Assistant Examiner* — Wendy Nicholas
(74) *Attorney, Agent, or Firm* — IP Legal Services, LLC

(57) ABSTRACT

Described embodiments provide for a method of recording events generated for performing a task through user equipment. In the method, an activation input may be received for activating an event recording mode. Upon the activation of the event recording mode, events generated in the user equipment may be recorded. Upon the receipt of an inactivation input for inactivating the event recording mode, an identification code may be assigned to a set of the recorded events. The set of the generated events may be stored with the assigned identification code.

17 Claims, 5 Drawing Sheets

(56) References Cited

U.S. PATENT DOCUMENTS

| | | | |
|---|---|---|---|
| 2006/0146057 A1* | 7/2006 | Blythe | G06F 9/45537 345/506 |
| 2008/0013717 A1* | 1/2008 | Brown | H04W 12/02 380/30 |
| 2008/0016187 A1* | 1/2008 | Neil | G06F 9/4443 709/220 |
| 2009/0144621 A1* | 6/2009 | Sangster et al. | 715/704 |
| 2010/0060571 A1* | 3/2010 | Chen | G06F 3/0227 345/157 |
| 2010/0088598 A1* | 4/2010 | Lee | H04M 1/72583 715/704 |
| 2010/0255885 A1 | 10/2010 | Lee | |
| 2011/0134030 A1* | 6/2011 | Cho | G06F 3/03547 345/157 |
| 2012/0005169 A1* | 1/2012 | Saxena | G06F 21/6227 707/687 |
| 2012/0011280 A1* | 1/2012 | Gilboa | G06F 3/0481 709/246 |
| 2012/0092277 A1* | 4/2012 | Momchilov | G06F 3/038 345/173 |
| 2012/0131481 A1* | 5/2012 | Gupta | G06Q 10/10 715/764 |
| 2012/0131645 A1* | 5/2012 | Harm | 726/4 |
| 2012/0220263 A1* | 8/2012 | Smith | H04W 4/003 455/410 |

FOREIGN PATENT DOCUMENTS

| | | |
|---|---|---|
| KR | 10-2010-0096352 A | 9/2010 |
| KR | 10-2010-0111351 A | 10/2010 |

* cited by examiner

```
<xs:schema xmlns=""mlns:xs=http://www.w3.org/2001/XMLSchema>
<xs:recoq name="MyDataSet">
    <xs:recoqType>
        <xs:Touch>
                <xs:element name="X"type="xs:inteqer" minOccurs="0"/>

<xs:element name="Y"type="xs:string" minOccurs="0"/>
                <xs:element name="Action"type="xs:string"/>
        <xs:Touch>
                    ...
    <xs:recoqType>
    <xs:recoq>
<xs:schema>
```
— 510 Schema

```
<event..reckey="1234">
    <activity>
        <time>
            <Touch>
                <x>112</x>
                <y>21</y>
                <action>mousedown</action>
            </Touch>
            <Acc>
                <x>1</x>
                <y>0</y>
                <z>-1</z>
            </Acc>
        </address>
    </address..rec>
```
— 520 Script

RECORDING EVENTS GENERATED FOR PERFORMING A TASK THROUGH USER EQUIPMENT

CROSS REFERENCE TO PRIOR APPLICATIONS

The present application claims priority under 35 U.S.C. §119 to Korean Patent Application No. 10-2011-0079686 (filed on Aug. 10, 2011), which is hereby incorporated by reference in its entirety.

FIELD OF THE INVENTION

The present invention relates to user equipment and, in particular, to recording events generated for performing a task through user equipment.

BACKGROUND OF THE INVENTION

A smart terminal may have a microprocessor and therefore has some processing capabilities independent of the host computer. Furthermore, the smart terminal may have a communication unit for communicating with other terminal and/or a server through a communication network. Due to the processing and communication capabilities of the smart terminal, the smart terminal has been very popular, lately. For example, the smart terminal may include a smart phone and a smart pad.

In general, the smart terminal may be installed with an operating system that supports voice and/or data communication, interaction with other terminals such as a personal computer and execution of various types of applications. For example, a user frequently uses the smart terminal to perform a predetermined task such as checking weather information, internet banking, and searching information through a web-browser. In order to perform such tasks, a user may download related applications from a server into the smart terminal and install the downloaded application on the smart terminal. The application may be referred to as Application software or APP. The application is computer software designed to help the user to perform specific tasks. Besides downloading and installing the application, a user may be required to perform several more operations to obtain a result of the predetermined task. For example, for checking weather information, a user may activate a weather application, select a time, a date, and a region, and more. If the user frequently uses the weather application, such requiring operations for obtaining the result may be annoying and inconvenient to the user.

SUMMARY OF THE INVENTION

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, events generated for performing a task requiring multiple complicated user operations may be recorded sequentially in order to enable a user to perform the task through simple operation.

In accordance with another aspect of the present invention, the recorded events may be stored with an identification code and the stored events may be retrieved based on an associated identification code.

In accordance with still another aspect of the present invention, the generated events may be recorded in a form of an extensible markup language (XML) script format.

In accordance with an embodiment of the present invention, a method may be provided for recording events generated for performing a task through user equipment,. The method may include receiving an activation input to activate an event recording mode, recording events generated in the user equipment upon the activation of the event recording mode, assigning an identification code to a set of the recorded events upon receipt of an inactivation input for inactivating the event recording mode, and storing the set of the generated events with the assigned identification code.

The receiving an activation input may include determining whether an input is the activation input of the event recording mode when the user equipment receives an input from a user and activating the event recording mode when the input is the activation input of the event recording mode. Otherwise, operations may be performed associated with the received input.

The activation input may be received through activation of at least one icon, shortcut, widget, and menu bar. The at least one icon, shortcut, widget, and menu bar are displayed with a graphic user interface of the user equipment. The activation input may be received through at least one of key buttons of the user equipment.

The events may be recorded as a script in a form of an extensible markup language (XML) format. The XML script of the recorded event may include a schema indicating a type of a related event and a script indicating data values of the recorded event. The data values may include information on a position of a touch input made on a touch screen and information on an object where the touch input is made on. The events may be recorded with supplementary information on a purpose of the events.

The assigned identification code may be a combination of integer numbers indentifying each set of recorded events stored in a memory of the user equipment. The set of recorded events may be stored with the assigned identification code in a form of a mapping table. The assigned identification code may be stored with an event type and an event purpose.

The method may further include determining whether an input is a retrieval input associated with retrieving one of sets of recorded events from the memory when the input is received from the user. When the input is the retrieval input, a set of recorded events may be retrieved based on the retrieval input, the retrieved set of recorded events may be performed in an order of recording the events, and the result of the performing the retrieved set of recorded events may be output through an output unit of the user equipment. Otherwise, operations associated with the received input may be performed. The retrieval input may be an identification code associated with a predetermined set of recorded events. The retrieval input may be received through activation of an icon individually generated corresponding to each set of recorded events and displayed with a graphic user interface of the user equipment. The retrieval input may be received through an input box displayed with a graphic user interface displayed on a display unit of the user equipment.

In accordance with another embodiment of the present invention, a non-transitory machine-readable storage medium, having encoded thereon program code, wherein, where the program code is executed by a machine, the machine implements a method of recording events generated for performing a task through user equipment, may be provided. The non-transitory machine-readable storage medium may include the steps of: receiving an activation input to activate an event recording mode; recording events generated in the user equipment upon the activation of the event recording mode; assigning an identification code to a set of the recorded events upon receipt of an inactivation input for inactivating the event recording mode; and storing the set of the generated events with the assigned identification code.

In accordance with still another embodiment of the present invention, a user equipment may be provided for recording events generated for performing a task that a user want to perform. The user equipment may include an input unit, a controller, and an output unit. The input unit may be configured to receive an activation input for activating an event recording mode, to receive an inactivation input for inactivating the event recording mode, and to receive a retrieval input for retrieving one of sets of recorded events. The controller may be configured to record events generated upon the receipt of the activation input for the event recording mode, to assign an identification code to a set of the recorded events upon the receipt of the inactivation input for inactivating the event recording mode, to store the set of the generated events with the assigned identification code, to retrieve the stored set of the generated events based on an identification code received through the input unit, and to perform the retrieved set of the events. The output unit may be configured to output a graphic user interface associated with the task and to output the performing result of the retrieved set of the events.

The user equipment may further include a communication unit configured to transmit the stored sets of recorded events to at least one of other user equipment and an associated server.

In accordance with still another embodiment of the present invention, a method may be provided for recording events generated in user equipment. The method may include receiving an activation input for an event recording mode through an input unit, recording a series of events sequentially for performing a predetermined application, receiving an inactivation input for inactivating the event recording mode, and assigning an identification code to the recorded series of events.

The event may include a touch event, a direction event, a text event, and a voice event. The touch event may be generated by a touch input made on a touch screen. The direction event may be generated by movement of the user equipment. The text event may be generated when a user enters texts through a keyboard on a touch screen. The voice event may be input through a microphone.

The recording a series of events may include receiving the series of events through at least one of an input unit and a sensor unit and recording data values of the series of events in a form of an extensible markup language (XML) script. The data values may be information on a touch position made on a touch screen and an object where a touch input is made. The XML script of the recorded series of events may be transferred to a server for developing and managing related applications.

The method may further include receiving an identification code through the input unit and performing a series of events assigned with the received identification code.

In accordance with yet another embodiment of the present invention, a method may be provided for recording events generated in first user equipment. The method may include receiving a record of events for performing an application from second user equipment, correcting the received record of events based on difference between an operation system type of the first user equipment and an operation system type of the second user equipment, and storing the corrected record of events. The received record of events may be data values of a series of events generated in the second user equipment from activation of an event recording mode to inactivation of the event recording mode. The correcting may performed by applying a predetermined offset value to the data value of the record of events.

BRIEF DESCRIPTION OF THE DRAWINGS

The above and/or other aspects of the present invention will become apparent and more readily appreciated from the following description of embodiments, taken in conjunction with the accompanying drawings, of which:

FIG. 5 shows a set of events recorded as an XML script in accordance with embodiments of the present invention.

DETAILED DESCRIPTION OF THE INVENTION

Figure 1:
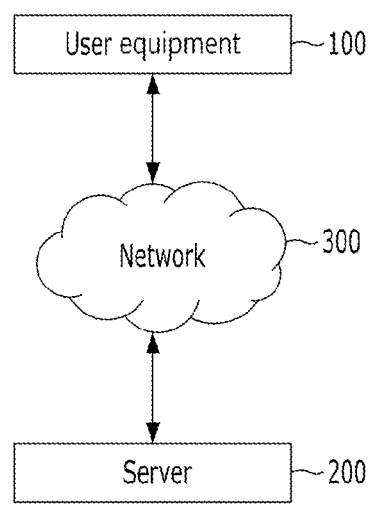
FIG. 1 shows user equipment connected to a server through a network in accordance with embodiments of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

FIG. 1 shows user equipment connected to a server through a network in accordance with embodiments of the present invention.

Referring to FIG. 1, user equipment 100 may be connected to server 200 through communication network 300. User equipment 100 may be an electronic device having a microprocessor and a communication unit so has processing and communicating capabilities. For example, user equipment 100 may perform certain operations and return a result thereof to a user and communicate with another device such as user equipment and server 200 through network 300. User equipment 100 may include, but is not limited to, a mobile terminal, a mobile device, a mobile phone, a portable terminal, a portable device, a handheld device, a cellular phone, a smart phone, a smart pad, a tablet personal computer (PC), a laptop PC, a personal digital assistant (PDA), wireless local loop (WLL) station, a portable multimedia player (PMP), and a navigation device. Due to the processing and communicating capabilities of user equipment 100, user equipment 100 may be used for performing various types of tasks, for example, Internet banking and weather checking. In order to perform such a task, a user may i) download an application for performing a predetermined task through network 300 from server 200 into user equipment 100, ii) install the downloaded application on user equipment 100, and iii) run the installed application. Typically, a user may be required to perform several more operations to accomplish a desired task such as Internet banking. For example, a user may be required to enter information in response to at least one inquiry of the application. Such operation may include entering a login name and a password and/or selecting a desired operation from a menu. In accordance with embodiments of the present invention, a user may be enabled to perform such a desired task through one or two simple operation by sequentially recording a series of events generated by the operations made from a user to perform the desired task.

Server 200 may be a service provider server of a service provider associated with a predetermined application that enables a user to perform a specific task through user equipment 100. Server 200 may provide services associated with applications of a related service provider. For example, server 200 may store and distribute applications that are developed by a related service provider. Furthermore, server 200 may manage the applications with interaction of user equipment 100 in accordance with embodiment of the present invention. For example, server 200 may be at least one of an application development server, an application distribution server, and an application management server.

In accordance with embodiments of the present invention, server 200 may provide applications associated with a task that a user wants to perform through user equipment 100. Furthermore, server 200 may collect information related to a specific application from a plurality of users and may analyze the collected information for developing a new application or for improving the existing applications.

As described above, user equipment 100 may enable a user to perform a desired task through simple operation by recording a series of events generated for performing the desired task in accordance with embodiments of the present invention. Hereinafter, such user equipment 100 will be described with reference to FIG. 2.

Figure 2:
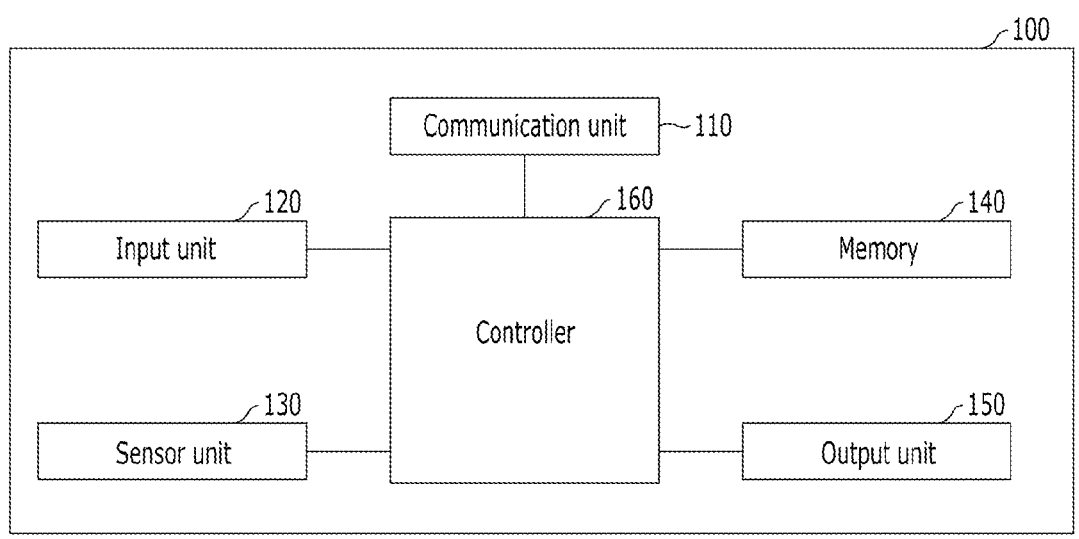
FIG. 2 shows user equipment in accordance with embodiments of the present invention.

FIG. 2 shows user equipment in accordance with embodiments of the present invention.

Referring to FIG. 2, user equipment 100 may include communication unit 110, input unit 120, sensor unit 130, memory unit 140, output unit 150, and control unit 160.

Communication unit 110 may include at least one module for radio communication between user equipment 100 and server 200 or between user equipment 100 and a network in the vicinity of user equipment 100. For example, communication unit 110 may include any or all of a mobile communication module, a wireless Internet module, and a short-distance communication module.

The mobile communication module may receive a wireless signal from and/or transmit a wireless signal to at least one of base stations, user equipments, and servers in a mobile communication network. The wireless signal may include data in various formats according to a type of the wireless signal, such as a voice call signal, a video call signal, a text message, and a multimedia message.

The wireless Internet module may be a module for wirelessly accessing the Internet. The wireless Internet module may be internally included in user equipment 100 or externally coupled to user equipment 100. The wireless Internet module may support various types of technologies for accessing the Internet, such as Wireless Local Area Network (WLAN), Wi-Fi, Wireless broadband (WiBro), World Interoperability for Microwave Access (WiMax), Institute of Electrical and Electronics Engineers (IEEE) 802.16m, high speed downlink packet access (HSDPA), high speed uplink packet access (HSUPA), high speed packet access (HSPA), and 3rd generation partnership project long term evolution (3GPP LTE), but is not limited thereto.

The short-distance communication module may be a module for a short-distance communication. The short-distance communication module may support related technologies, for example, Bluetooth, Radio Frequency Identification (RFID), Infrared Data Association (IrDA), Ultra Wideband (UWB), ZigBee, and Near Field Communication (NFC), but is not limited thereto. Furthermore, the short-distance communication module may include a wired communication module such as a universal serial bus (USB) communication module and a high definition multimedia interface (HDMI) communication module.

Input unit 120 may be a user interface for receiving inputs from a user. Such input unit 130 may be realized as various types. For example, input unit 130 may include any of a keypad, a touch pad, a jog wheel, and/or a jog switch, but is not limited thereto. Input unit 130 may include at least one operation unit for inputting commands in order to control the operation of user equipment 100. Particularly, user equipment 100 may include a touch screen as a display module in order to satisfy demands of expanding a display screen, making better use of a space, and improving design. When user equipment 100 employs a touch screen, input unit 120 may be integrally realized with a display module of output unit 150. For example, input unit 130 may be realized as a soft key type input unit on the display module of user equipment.

Sensor unit 130 may detect a current status of user equipment 100. For example, sensor unit 130 may sense movement of user equipment 100, opening or closing of a cover of user equipment 100, a location and a bearing of user equipment 100, acceleration and deceleration of user equipment 100, or physical contact with or proximity to a user. Based on the detected status or the detected movement of the user equipment 100, sensor unit 130 may generate a sensing signal to control the operation of user equipment 100. For example, in the case of a mobile phone having a sliding type cover, sensor unit 130 may sense whether a cover is opened or closed. Sensor unit 130 may sense whether or not power is supplied or whether or not an external device is coupled thereto.

Sensor unit 130 may include an acceleration sensor for measuring acceleration of user equipment 100, a gyroscope sensor for recognizing an axis of user terminal 100, a gravity sensor for sensing a direction of gravity, a magnetic field sensor for measuring a direction of magnetic field, and a luminance sensor for sensing luminance around user equipment 100.

Memory 140 may store programs for operations of controller 160 and input/output data. Furthermore, Memory 140 may store applications for performing operations associated with tasks that a user wants to perform through user equipment 100 in accordance with embodiments of the present invention. Memory 140 may store events generated to perform a certain task. Such events may be recorded in a form of an extensible markup language (XML) format.

Furthermore, memory 140 may store various data such as contact lists, e-mails, messages, pictures, video files, various vibration patterns and effect sounds in response to a touch input made on a touch screen. Memory 140 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, but is not limited thereto. In accordance with embodiments of the present invention, user equipment 100 may interact with a web-based storage that performs the storage function of memory 140. Furthermore, memory unit 140 may be an internal memory, but the present invention is not limited thereto. Memory unit 140 may be extendable through an external memory.

Output unit 150 may generate visual outputs and/or audio outputs. Output unit 150 may include a display module and an audio output module. The present invention, however, is not limited thereto. Output unit 150 may further include various types of outputs modules including an alarm module for outputting a signal to inform a user of events generated in user equipment 100 and a haptic module for outputting various types of haptic effects that a user may sense.

The display module may output information processed by user equipment 100. For example, in the case of an on-call mode, the display module may display a user interface (UI) or a graphical user interface (GUI) according to a type of a call. In the case of a video call mode or a photographing mode, the display module may display a UI or a GUI related to receive video or display captured image or video. The display module may be a liquid crystal display (LCD), a thin film transistor LCD (TFT LCD), an organic light emitting diode (OLED), a flexible display, or a 3D display, but is not limited thereto.

User equipment 100 may employ a touch screen to form the display module. The touch screen may have a layered structure formed of a display module and a touch sensor disposed over or under the display module. Accordingly, the display module may be used not only as an output device but also as an input device when the touch screen is employed as a component of the display module.

The touch sensor may be in a form of a touch film, a touch sheet, or a touch pad. The touch sensor may convert pressure applied to a specific part of the display module and capacitance variation formed around a specific part of the display module in accordance with an electric input signal. The touch sensor may detect pressure and/or a directivity of a touch input as well as a location and/or an area of a touch input made on a touch sensor. When the touch sensor senses a touch input, the touch sensor may transmit a corresponding signal to a touch controller. The touch controller may process the signal from the touch sensor and transmit corresponding data to controller 160. Accordingly, controller 160 can be aware of which part of a display module has been touched.

The audio output module may output audio data stored in memory 140 or received from communication unit 110 in an on-call mode, in a recording mode, in a voice recognition mode, and/or in a broadcasting receiving mode. The audio output module may output an audio signal corresponding to functions performed by user equipment 100. For example, the audio output module may output a call-signal receiving sound or a message receiving sound. Such an audio output module may include a speaker.

Controller 160 may control an overall operation of user equipment 100. For example, controller 160 may control and process a voice call, a text message, and a video call. In accordance with embodiments of the present invention, controller 160 may control and perform operations associated with applications running for accomplishing tasks of a user.

As described, user equipment 100 may record events generated for performing a task requiring multiple user operations in order to enable the user to perform the task through simple user operation in accordance with embodiments of the present invention. Such operation of user equipment 100 will be described with reference to FIG. 3 and FIG. 4.

Figure 3:
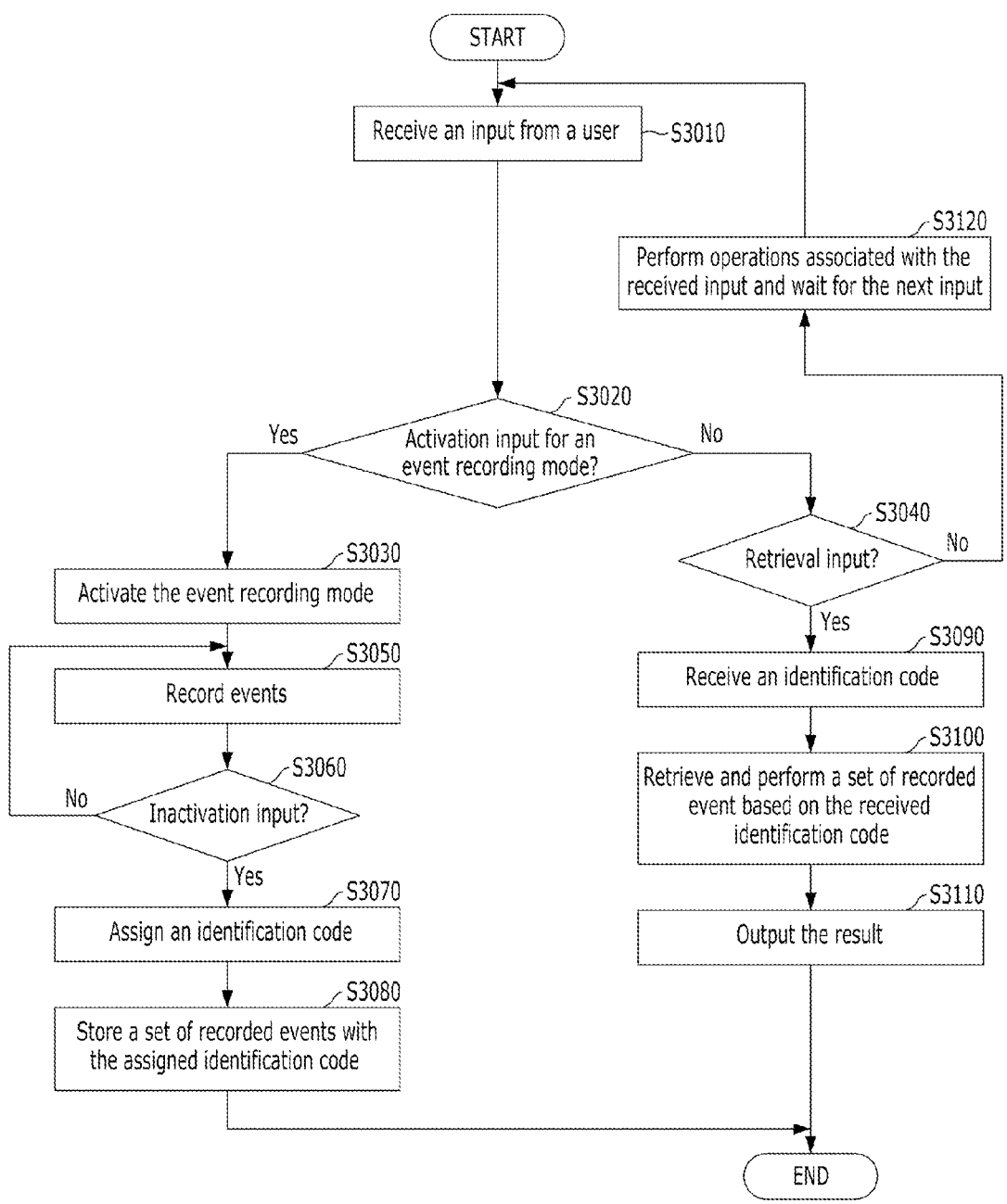
FIG. 3 shows a method for recording events generated for performing a task requiring multiple user operations in accordance with embodiments of the present invention.
Figure 4:
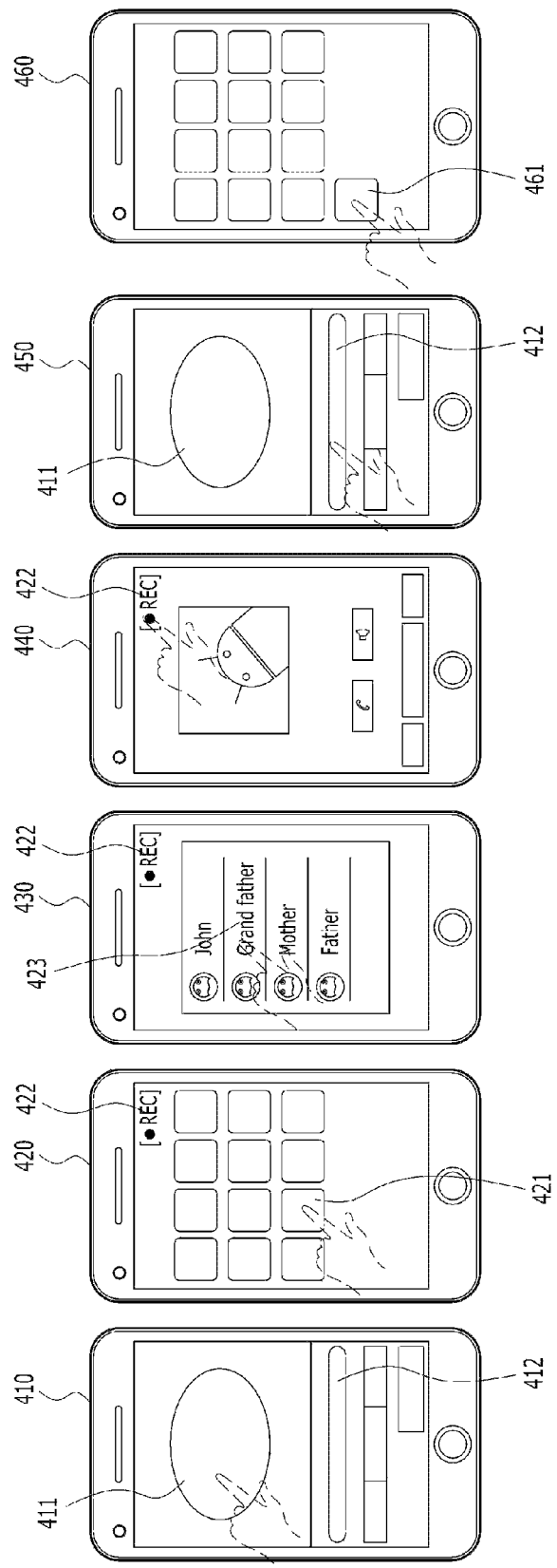
FIG. 4 shows graphic user interfaces (GUIs) displayed on user equipment according to the method of FIG. 3 in accordance with embodiments of the present invention.

FIG. 3 shows a method for recording events generated for performing a task requiring multiple user operations in accordance with embodiments of the present invention. FIG. 4 shows graphic user interfaces (GUIs) displayed on user equipment according to the method of FIG. 3 in accordance with embodiments of the present invention.

Referring to FIG. 3 and FIG. 4, user equipment 100 may receive an input from a user at step S3010. Upon the receipt of the input, user equipment 100 may determine whether the received input is an activation input for an event recording mode at step S3020. For example, user equipment 100 may provide a graphic user interface (GUI) for receiving such an activation input for the event recording mode. Such a GUI may be provided in a form of a menu, an icon, a shortcut, a widget, and/or a notification bar, which are displayed on a background of a default GUI of user equipment 100. The default GUI of user equipment 100 may be a GUI of an operating system of user equipment 100. Furthermore, the activation input for an event recording mode may be received through any types of keys or buttons of user equipment 100. In this case, the activation input for the event recording mode may be received through one or a combination of keys and/or buttons of user equipment 100. For example, a long press of a certain key or button may be the activation input for the event recording mode. Two repetitions of the same key or button may be the activation input for the event recording mode. Such an activation input for the event recording mode may display another GUI for the event recording mode as shown in GUI 410 of FIG. 4. As shown in FIG. 4, event recording mode GUI 410 may include activation icon 411 and text input box 412. When a user makes a touch input on icon 411, the event recording mode may be activated.

When the received input is the activation input (Yes-S3020), user equipment 100 may activate the event recording mode at step S3030. For example, user equipment 100 may display, on GUI 420 of user equipment 100, icon 422 that indicates the activation of the event recording mode.

Upon the activation, user equipment 100 may record events generated after the activation at step S3050. For example, the events may include operations and/or controls of user equipment 100 for running an application of a task that a user wants to perform through user equipment 100. The event may further include user inputs made in response to the operations and/or the controls of user equipment 100 for running the application. That is, the events may be any actions generated in user equipment 100 in order to perform a task that a user wants. Such events may be received through input unit 120 and/or sensor unit 130. For example, the event may include operations of clicking an icon displayed on a default GUI of user equipment 100, activating an application associated with the icon, displaying a GUI of the activated application, inquiring a predetermined input to the user, receiving the input from the user through an input box of the GUI, receiving selection of a menu of the GUI, receiving a keypad input from the user, and likes. In accordance with embodiments of the present invention, such events may be recorded sequentially in the event activation mode. For example, GUIs 430, 440, and 450 of FIG. 4 may show recording events generated for making a phone call to a specific person. After activating the event recording mode, user terminal 100 may receive a touch input made on phone icon 421 of GUI 420. Then, user equipment 100 may run an application associated with the touch input and display, as a result of running, a list of contacts on output unit 150 as shown in GUI 430 of FIG. 4. User equipment 100 may receive from a user a selection input to select a person such as grandfather from the list as shown in GUI 430 of FIG. 4. As a result of the selection input, user equipment 100 may retrieve a telephone number of the selected person, perform operations to make a phone call to the selected person with the retrieved telephone number, and display related GUI 440 of user equipment 100 as shown in FIG. 4. Such a sequence of operations and inputs may be a series of events generated for performing a call making task that the user wants to perform. In the event recording mode, such a series of events may be recorded in accordance with embodiments of the present invention. For another example, when a user wants to perform a task for checking weather information, a series of events may be activating a weather application, activating the weather application, displaying a GUI associated with the weather application as a result, receiving selection inputs for a time, a date, and a region, accessing a weather information server, retrieving weather information based on the received selection inputs, and displaying the retrieved weather information. Typically, a user may be required to perform such multiple operations for obtaining the weather information. If the user frequently and regularly checks the weather information, such multiple required operations may be annoying and inconvenient for the user. In accordance with embodiments of the present invention, such multiple required operations may be recorded in order for enabling a user to perform such annoying task through one or two simple operations.

Such events may be recorded as a script in an extensible markup language (XML) format as shown in FIG. 5. For example, XML script 500 recorded as a set of events may include schema part 510 and script part 520. A type of events may be recorded in a form of a schema in schema part 510. Data values of events may be recorded in a script in script part 520. The present invention, however, is not limited thereto. Events may be recorded in other type of formats.

In accordance with embodiments of the present invention, events may include a touch event, a direction event, a text event, and a voice event, but the present invention is not limited thereto. The touch event may be generate when a user make a touch input on a touch screen. The touch event may include tapping, pinching, panning, dragging, swiping, rotation, and long press. A data value of a touch event may be information on a position of a touch input made on a touch screen. For example, the data value of the touch event may be a XY coordinate value. Furthermore, the data value of the touch event may be a target view. The target view may denote an object where the touch input made.

The touch position information may differ according to an orientation of user equipment 100, such as a portrait orientation and a landscape orientation. The portrait orientation may be referred to as a vertical orientation and the landscape orientation may be referred to as a horizontal orientation. Accordingly, when a touch event is generated, the orientation of user equipment 100 may be additionally recorded with the XY coordinate value. Or, when a touch event is generated at the portrait orientation, a XY coordinate value of the touch event in the landscape orientation may be additionally included as well as a XY coordinate value in the portrait orientation. The XY coordinate value may be recorded as an absolute value or as an aspect ratio. An aspect ratio and a resolution of a touch screen may differ according to an operating system (OS). If a XY coordinate value is recorded as aspect ratio, the recorded event value may be easily reused in other type of user equipments.

The target view may be information used for identifying a target or an object of a touch event. For example, the target view may be information on an application, a menu, and a log-in box where the touch input is made. The target view may include information on a name of an object, for example, a name of an application. The target view may be recorded with or without the touch position information when the touch event is generated. When the target view is recorded without the touch position information, the same result may be obtained in the same user equipment although an icon position of an application is changed due to addition/deletion/modification of applications. When the target view is recorded with the touch position information, an error message may be provided if an object associated with the touch position information is different from an object associated with the information on the recorded target view.

The direction event may be generated when user equipment 100 moves. For example, when a user rotates user equipment 100 to a vertical direction and a horizontal direction, sensor unit 130 of user equipment 100 may sense such movement. The data value of the direction event may be a direction or a size of a XYZ axis extracted from the acceleration sensor or the gyroscope sensor.

The text event may be inputs made through a keyboard on a touch screen. The text event may be recorded or generated in consideration of a security level of a corresponding text. For example, when a user input a password with a higher security level, such text event may not be recorded. Alternatively, such password may be stored after encryption. A user may be enabled to record a security level of a password when a corresponding text event is recorded or through an editing step after the corresponding text event is recorded. The voice event may input through a microphone.

If an event is recorded without information on a purpose of the event, user equipment 100 may not recognize the purpose of the recorded event. Accordingly, a data value of an event may be recorded with supplementary information on the purposes of the event. For example, the purpose of the event may be for running an application, for setting an environment, and for selecting a menu. The supplementary information may be recorded simultaneously when the event is recorded. Alternatively, the supplementary information may be recorded through an additional editing step after recording the event. The supplementary information may be provided as a form of a list.

Referring to FIG. 3, the recording events may be continued until the event recording mode is inactivated. Accordingly, user equipment 100 may determine whether the generated event is an inactivation input when new event is generated at step S3060. For example, the inactivation input may be initiated by clicking icon 422 of GUI 440 of FIG. 4, but the present invention is not limited thereto. Similar to the activation input for the event recording mode, various types of inputs may initiate the inactivation input.

When the generated event is not the inactivation input (No-S3060), user equipment 100 may continuously record the generated event at step S3050. When the generated event is the inactivation input (Yes-S3060), user equipment 100 may inactivate the event recording mode and assign an identification code to the set of recorded events at step S3070. The identification code may be unique numbers assigned to the set of the recorded events. Based on the assigned identification code, the set of recorded events may be retrieved from memory of user equipment 100 in accordance with embodiments of the present invention. The identification code may include supplementary information on an event type and an event purpose.

After assigning the identification code, user equipment 100 may store the set of recorded events with the assigned identification code in a memory of the user equipment at step S3080. For example, the set of recorded events and the assigned identification code may be stored in a form of a mapping table in memory unit 140 of user equipment 100.

When the received input is not the activation input for the event recording mode (No-S3020), user equipment 100 may determine whether the received input is an activation input for retrieving a predetermined set of recorded events from memory unit (i.e., retrieval input) at step S3040.

When the received input is not the activation input for retrieving the predetermined set of recorded events (No-S3040), user equipment 100 may perform operations associated with the received input and wait for the next input at step S3120.

When the received input is the activation input for retrieving the predetermined set of recorded events (Yes-S3040), user equipment 100 may provide a user interface to receive an identification code associated with the predetermined set of recorded events at step S3090. For example, the user interface may be GUI 450 with input box 412 for receiving the identification code. Furthermore, the user interface may be icon 461 displayed with GUI 460 as shown in FIG. 4. Such icon 461 may be individually generated for each set of recorded events. Such icon 461 may be displayed on a background of a default GUI of user equipment 100. In this case, a user may click a corresponding icon to retrieve the predetermined set of recorded events. In addition, a user interface may be provided to allow a user to directly choose one of XML script files.

Upon the receipt of the identification code, user equipment 100 may retrieve the set of recorded events from the memory and perform the retrieved set of recorded events at step S3100. For example, user equipment 100 may perform the retrieved set of events in an order of recording the events. In this manner, a user does not require to perform multiple operations for performing a predetermined task. By performing simple user operation, the user may obtain the same result because user equipment 100 automatically performs the retrieved set of the recorded events in sequence.

User equipment 100 may output the result thereof through the output unit 150 at step S3110. For example, user equipment 100 may generate the result by performing the retrieved set of recorded events in order and display the result on output unit. The result may be output through various types of output units including a display unit and a speaker.

FIG. 5 shows a set of events recorded as an XML script in accordance with embodiments of the present invention.

Referring to FIG. 5, a set of events may be recorded as a script in an extensible markup language (XML) format. For example, XML script 500 may include schema part 510 and script part 520. Schema part 510 may include information on a type of events m in a form of a schema. Script part 520 may include information on data values of events as a script. The present invention, however, is not limited thereto. Events may be recorded in other types of formats.

Since events are recorded and stored in a form of a XML script, such record of events may be transferrable to another terminal. Accordingly, a user may easily set up new user equipment to have the same icons and GUIs related to the recorded events set on old user equipment by simply transferring the recorded XML scripts from the old user equipment to the new user equipment. An operating system (OS) type may be different between the old user equipment and the new user equipment. In this case, a type and a position of menus and icons within a GUI of a corresponding application may differ according to the OS type. Accordingly, the recorded scripts may be modified by applying a predetermined offset when the recorded scripts are transferred between two user equipments installed with different operating systems.

As described above, a user may be enabled to perform a predetermined task by simple operation although such task requires the user to perform multiple consecutive operations. Accordingly, the user may conveniently accomplish a desired task without performing annoying and complicated operations. In addition, the stored sets of recorded events may be used to develop and manage applications in server 200. Such operation will be described with reference to FIG. 6.

Figure 6:
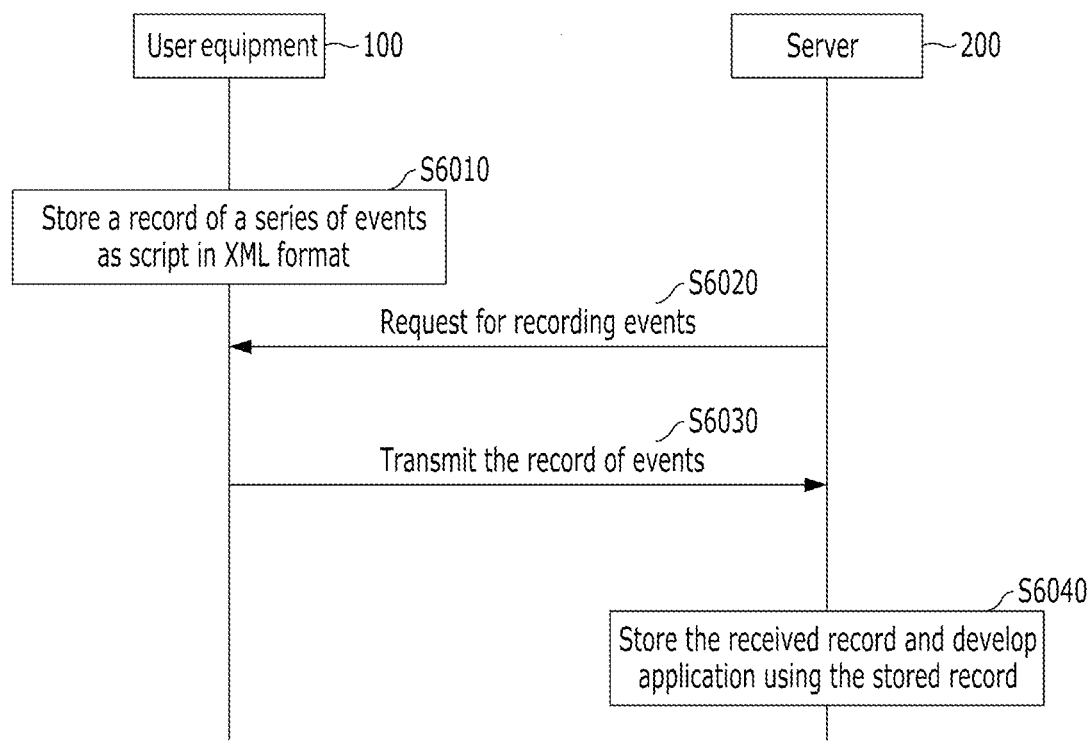
FIG. 6 shows a method for transferring sets of recorded events from user equipment to a server in accordance with embodiments of the present invention.

FIG. 6 shows a method for transferring sets of recorded events from user equipment to a server in accordance with embodiments of the present invention.

Referring to FIG. 6, user equipment 100 may store sets of recorded events in a form of a XML script at step S6010. As described above, events generated associated with a desired task may be recorded and stored in a form of a XML script.

At step S6020, user equipment 100 may receive a request from server 200. At step S6030, user equipment 100 may transmit the stored sets of recorded events to server 200 in response to the request.

At step S6040, server 200 may receive the sets of recorded events from equipment 100 and store the received sets of recorded events in a related database (not shown). Server 200 may use such collected event records to analyze patterns related to a specific application, for example, a pattern of using a specific application, a proper position of a menu or an icon related to a specific application, and a typographic error pattern of specific numbers and characters. Such analysis result may be used to develop a new application and to improve an existing application.

For another example, server 200 may optimize a script file of a specific application by analyzing the collected scripts from multiple users. Server 200 may distribute such an optimized script to other users.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of recording events generated for performing a task through user equipment configured to run under a first type operating system, the method comprising:
   receiving, by the user equipment, an activation input to activate an event recording mode;
   recording, by the user equipment, events generated in the user equipment upon the activation of the event recording mode, wherein the events include at least one of a touch event generated by a touch input made on a touch screen of the user equipment and a direction event generated by the movement of the user equipment;
   assigning, by the user equipment, an identification code to a set of the recorded events upon receipt of an inactivation input for inactivating the event recording mode;
   storing, by the user equipment, the set of the recorded events with the assigned identification code, in a memory of the user equipment; and
   transmitting a record of events stored in the user equipment to at least one of a different user device and a server,
   wherein in a case that the record of events is transmitted from the user equipment to the different user device configured to run under a second type operating system,
   the record of events is modified by applying an offset value determined based on difference between an operating system type of the user equipment and an operating system type of the different user device;
   wherein in a case that the record of events includes a position value of the touch input made on the touch screen of the user equipment, the offset value is a value for adjusting the position value of the touch input such that the different user device automatically performs the same task as a corresponding task performed in the user equipment; and
   wherein in a case that the touch input is made in one of a portrait orientation mode and a landscape orientation mode of the user equipment,
   the record of events includes both (i) a first position value of the touch input in the one of the portrait orientation mode and the landscape orientation mode and (ii) a second positon value of the touch input in the other of the portrait orientation mode and the landscape orientation mode such that the first and second position values of the touch input are applied selectively according to an orientation mode.

2. The method of claim 1, wherein the receiving an activation input includes:
   determining whether an input is the activation input of the event recording mode when the user equipment receives an input from the user;
   activating the event recording mode when the input is the activation input of the event recording mode;
   otherwise, performing operations associated with the received input.

3. The method of claim 1, wherein the activation input is received through activation of at least one icon, shortcut, widget, and menu bar, wherein the receiving includes displaying the at least one icon, shortcut, widget, and menu bar with a graphic user interface of the user equipment; and
   wherein the receiving receives the activation input through at least one of key buttons of the user equipment.

4. The method of claim 1, wherein the recording records events as a script in a form of an extensible markup language (XML) format; and
   the XML script of the recorded event includes a schema indicating a type of a related event and a script indicating data values of the recorded event.

5. The method of claim 4, wherein the data values include information on a position of the touch input made on the touch screen and information on an object where the touch input is made on.

6. The method of claim 1, wherein:
   the recording records events with supplementary information on a purpose of the events;
   the assigned identification code is a combination of integer numbers identifying each set of recorded events stored in the memory of the user equipment; and
   the set of recorded events is stored with the assigned identification code in a form of a mapping table.

7. The method of claim 1, wherein the assigned identification code is stored with an event type and an event purpose.

8. The method of claim 1, further comprising:
   determining whether an input is a retrieval input associated with retrieving one of sets of recorded events from the memory when the input is received from the user; and
   when the input is the retrieval input, retrieving a set of recorded events based on the retrieval input, performing the retrieved set of recorded events in an order of recording the events, and outputting the result of the performing the retrieved set of recorded events through an output unit of the user equipment;
   otherwise, performing operations associated with the received input.

9. The method of claim 8, wherein the retrieval input is an identification code associated with a predetermined set of recorded events.

10. The method of claim 8, wherein the retrieval input is received by activating an icon individually generated corresponding to each set of recorded events and displayed with a graphic user interface of the user equipment.

11. The method of claim 8, wherein the receiving comprises receiving the retrieval input through an input box by displaying the input box with a graphic user interface on a display unit of the user equipment.

12. The method of claim 1, wherein the server is configured to:
   receive the record of events associated with the task from the user equipment; and
   obtain pattern information associated with use of the specific application by analyzing the received event records.

13. The method of claim 12, wherein the pattern information includes a typographical error pattern associated with at least one of a number input and a character input.

14. A user equipment, configured to run under a first type operating system, of recording events generated for performing a task that a user wants to perform, the user equipment comprising:
   an input unit configured to receive an activation input to activate an event recording mode, to receive an inactivation input for inactivating the event recording mode, and to receive a retrieval input for retrieving one of sets of recorded events;
   a controller configured (i) to record events generated upon the receipt of the activation input for the event recording mode, (ii) to assign an identification code to a set of the recorded events upon the receipt of the inactivation input for inactivating the event recording mode, (iii) to store the set of the recorded events with the assigned identification code, in a memory of the user equipment, (iv) to retrieve the stored set of the recorded events based on an identification code received through the input unit, and (v) to perform the retrieved set of the events;
   an output unit configured to output a graphic user interface associated with the task and to output the performing result of the retrieved set of the events; and
   a communication unit configured to transmit a record of events to at least one of a different user device and a server,
   wherein in a case that the record of events is transmitted from the user equipment to the different user device configured to run under a second type operating system,
   the controller is configured to modify the record of events by applying an offset value determined based on difference between an operating system type of the user equipment and an operating system type of the different user device;
   wherein the events include at least one of a touch event generated by a touch input made on a touch screen of the user equipment and a direction event generated by the movement of the user equipment;
   wherein in a case that the record of events includes a position value of the touch input made on the touch screen of the user equipment, the offset value is a value for adjusting the position value of the touch input such that the different user device automatically performs the same task as a corresponding task performed in the user equipment; and
   wherein in a case that the touch input is made in one of a portrait orientation mode and a landscape orientation mode of the user equipment,
   the record of events includes both (i) a first position value of the touch input in the one of the portrait orientation mode and the landscape orientation mode and (ii) a second positon value of the touch input in the other of the portrait orientation mode and the landscape orientation mode such that the first and second position values of the touch input are applied selectively according to an orientation mode.

15. The user equipment of claim 14, wherein:
the events are recorded as a script in a form of an extensible markup language (XML) format, the (XML) script of the recorded event includes a schema indicating a type of a related event and a script indicating data values of the recorded event, the data values include information on a position of the touch input made on the touch screen and information on an object where the touch input is made on, and the events are recorded with supplementary information on a purpose of the events;
the assigned identification code is a combination of integer numbers identifying each set of recorded events stored in the memory of the user equipment; and
the set of recorded events is stored with the assigned identification code in a form of a mapping table.

16. A method of recording events in a first user equipment configured to run under a first type operating system, the method comprising:
receiving a record of events for performing a task, from a second user equipment configured to run under a second type operating system, wherein the second user equipment is configured to record the events generated in the second user equipment upon activation of an event recording mode and to transmit the record of events to at least one of the first user equipment and a server, and wherein the events include at least one of a touch event generated by a touch input made on a touch screen of the second user equipment and a direction event generated by the movement of the second user equipment;
modifying the received record of events by applying an offset value determined based on difference between an operation system (OS) type of the first user equipment and an operation system (OS) type of the second user equipment, wherein in a case that the received record of events includes a position value of the touch input made on the touch screen of the second user equipment, the offset value is a value for adjusting the position value of the touch input such that the first user equipment automatically performs the same task as a corresponding task performed in the second user equipment;
storing the modified record of events in a memory of the first user equipment; and
automatically performing the task using the stored modified record of events according to a user request,
wherein in a case that the touch input is made in one of a portrait orientation mode and a landscape orientation mode of the second user equipment,
the received record of events includes both (i) a first position value of the touch input in the one of the portrait orientation mode and the landscape orientation mode and (ii) a second positon value of the touch input in the other of the portrait orientation mode and the landscape orientation mode such that the first and second position values of the touch input are applied selectively according to an orientation mode.

17. The method of claim 16, wherein:
the received record of events is formed as a script in a form of an extensible markup language (XML) format;
the (XML) script of the received record includes a schema indicating types of related events and a script indicating data values of the related events; and
the data values include information on a position of the touch input made on the touch screen and information on an object where the touch input is made on.

* * * * *